Patented May 19, 1936

2,040,882

UNITED STATES PATENT OFFICE 2,040,882

CELLULOSE DERIVATIVE COMPOSITIONS

Norman D. Scott, Niagara Falls, N. Y., assignor to E. I. du Pont de Nemours & Company, Wilmington, Del., a corporation of Delaware No Drawing. Application September 13, 1934, Serial No. 743,842

18 Claims. (Cl. 106—37)

This invention relates to new compositions of matter, more particularly to cellulose derivative compositions, and specifically to cellulose derivative compositions containing esters of dihydronaphthalenedicarboxylic acids.

The art of cellulose derivatives and other plastic materials has made use of many modifying materials. These modifying materials vary in their properties and thus are suitable under different circumstances. It is desirable to have a wide variety of modifying or plasticizing materials, and the esters of the present invention are useful, inter alia, in this way.

An object of the present invention is the preparation of organic plastic compositions containing esters of dihydronaphthalenedicarboxylic acids. A still further object is the preparation of lacquers and coating compositions. Other objects will appear hereinafter.

These objects are accomplished by the following invention wherein an ester of a dihydronaphthalenedicarboxylic acid, preferably an ester of a dihydronaphthalenedicarboxylic acid containing a hydrogen atom and a carboxyl group on each of two carbon atoms is incorporated with an organic plastic substance, and particularly a cellulose derivative to form plastic compositions of improved utility and value.

In my copending application Serial No. 743,843, filed herewith, there are disclosed methods for the preparation of esters of dihydronaphthalenedicarboxylic acids. This application discloses a wide variety of esters, including the dibutyl, the dimethoxyethyl, the dicyclohexyl, the diethyl, the dimethyl, and the didodecyl esters, as well as mixed esters, such as the methoxyethyl methyl esters.

The esters prepared as described in the above-mentioned application vary in physical properties from substantially colorless oily liquids to very viscous liquids which probably could be induced to crystallize. They are extremely high-boiling and are of correspondingly low volatility and are quite compatible with cellulose derivatives. The esters are readily soluble in all the common organic solvents and are generally miscible with other materials commonly used as plasticizers. They are likewise compatible with various natural and synthetic resins such as polyvinyl acetate, polymerized methyl methacrylate, polyhydric alcohol-polybasic acid resins, phenol-aldehyde resins, modified phenol aldehyde resins of the Amberol, Beckacite, etc. type, ether resins, and many natural resins such as damar, elemi, shellac, etc. It is to be noted that these resins as well as the cellulose derivatives with which the esters are compatible are highly polymeric materials containing a plurality of C—O—C linkages, and it is perhaps because of this fact that the esters of the present invention are so generally compatible with these materials.

The esters of the dihydronaphthalenedicarboxylic acids of the above-mentioned application, i. e., acids which have a hydrogen and a carboxyl group on each of two carbon atoms, such as 1,2-dihydronaphthalene-1,2-dicarboxylic acid and 1,4-dihydronaphthalene-1,4-dicarboxylic acid as well as the esters of other dihydronaphthalenedicarboxylic acids, such as 3,4-dihydronaphthalene-1,2-dicarboxylic acid, or dihydronaphthalic acid are of utility with the resins, cellulose derivatives, etc. above noted.

Typical coating compositions containing these derivatives as plasticizers are given in the following examples:

Example 1

| | Parts |
|---|---|
| Cellulose nitrate | 12 |
| Damar | 3 |
| Dibutyl dihydronaphthalenedicarboxylate | 4 |
| Castor oil | 2.6 |
| Solvent | 166 |

Example 2

| | Parts |
|---|---|
| Polyvinyl acetate | 10 |
| Diethyl dihydronaphthalenedicarboxylate | 3 |
| Solvent | 100 |

Example 3

| | Parts |
|---|---|
| Cellulose acetate | 12 |
| Dimethoxyethyl dihydronaphthalenedicarboxylate | 6 |
| Solvent | 182 |

Example 4

| | Parts |
|---|---|
| Ethyl cellulose | 10 |
| Resin | 6 |
| Dicyclohexyl dihydronaphthalenedicarboxylate | 6 |
| Paraffin wax | 2 |
| Solvent | 170 |

Example 5

| | Parts |
|---|---|
| Polyhydric alcohol-polybasic acid resin | 10 |
| Diacetyloxyethyl dihydronaphthalenedicarboxylate | 4 |
| China-wood oil | 6 |
| Solvent | 20 |

The above lacquers give films which dry in a few minutes. The films are tough, flexible and very durable. By the term "solvent" in the above examples is to be understood suitable mixture of esters, alcohols, and hydrocarbons such as would be obvious to one skilled in the art. Typical plastic compositions containing these new compounds are given in the following examples:

Example 6

| | Parts |
|---|---|
| Cellulose acetate | 100 |
| Dimethoxyethyl dihydronaphthalenedicarboxylate | 40 |

Example 7

| | Parts |
|---|---|
| Cellulose nitrate | 100 |
| Didodecyl dihydronaphthalenedicarboxylate | 50 |
| Pigment (including color) | 200 |

Example 8

| | Parts |
|---|---|
| Ethyl cellulose | 100 |
| Carbomethoxymethyl methyl dihydronaphthalenedicarboxylate | 15 |

Example 9

| | Parts |
|---|---|
| Polymerized methyl methacrylate | 100 |
| Dibutyl dihydronaphthalenedicarboxylate | 20 |

The above plastic compositions may be prepared with or without the usual volatile solvents, that is, alcohol for cellulose nitrate compositions, acetone for cellulose acetate compositions, toluol-alcohol for ether compositions, etc. Other cellulose derivatives such as cellulose propionate, cellulose butyrate, cellulose aceto-butyrate, benzyl cellulose, glycol cellulose, etc. may be employed. Ether resins, ketone condensation resins, etc. may replace the resins of the above compositions. Castor oil, linseed oil, China-wood oil, and other drying and semi-drying oils may replace the oils of the above compositions. The esters of the present invention may be used in various proportions with these materials. Thus, with cellulose derivatives, compositions containing 5, 10, 20, 30, 40, 50, 60, 70, 80, 90, 100%, even up to 150% to 200%, based on the weight of the cellulose derivative, may be employed.

Any part of the plasticizer may be replaced by one or more other plasticizers of the group covered by the present invention, or by one or more of the plasticizers already known to the art such as triacetin, camphor, dibutyl phthalate, tricresyl phospate, dimethoxyethyl phthalate, ethyl p-toluenesulfonamide, in order to obtain by the combination a particularly close approximation to the ideal plasticizer under the conditions of operation.

This is particularly true of the ether alcohol esters and the lower alkyl esters. For cellulose acetate, the ether alcohol esters and the methyl esters are of particular utility; with cellulose nitrate the esters of dihydronaphthalenedicarboxylic acids with dodecyl alcohol or with the mixture of alcohols obtainable by the carboxyl hydrogenation of oil such as coconut oil and palm kernel oil, are particularly useful, particularly in the preparation of coated fabrics. Instead of the crude product from the carboxyl hydrogenation fractions thereof may be employed. Thus, the first runnings largely including octyl alcohol, the main portion largely including dodecyl and tetradecyl alcohols, or the tail fraction of alcohols higher than these, may be employed, depending upon the particular purpose to be attained.

The esters prepared by the methods above disclosed and esters of other dihydronaphthalenedicarboxylic acids may be used in the preparation of all types of compositions containing cellulose derivatives, natural and synthetic resins, and/or drying oils. The cellulose derivative compositions are of particular utility in the preparation of lacquers and varnishes for coating metal and wood, dopes for coating fabrics, moisture-proof lacquers for coating regenerated cellulose, plastic compositions for use in the preparation of toilet ware, novelties, sheeting, rods, tubes, safety glass interlayers, etc. in lacquers for coating wire screen and cables, and in the preparation of thin transparent sheets useful inter alia for wrapping purposes.

The esters are extremely high boiling, water resistant plasticizers of high compatibility with cellulose derivatives, natural and synthetic resins and oils, and give permanently flexible products of good durability.

The above description and examples are intended to be illustrative only. Any modification of or variation therefrom which conforms to the spirit of the invention is intended to be included within the scope of the claims.

I claim:

1. A plasticized composition containing a cellulose derivative and, as a plasticizer therefor, an ester of a dihydronaphthalenedicarboxylic acid.

2. A composition of matter comprising a cellulose derivative and a monohydric alcohol ester of a dihydronaphthalenedicarboxylic acid.

3. A composition of matter comprising cellulose acetate and a monohydric alcohol ester of a dihydronaphthalenedicarboxylic acid.

4. A composition of matter comprising cellulose nitrate and a monohydric alcohol ester of a dihydronaphthalenedicarboxylic acid.

5. A composition of matter comprising a cellulose derivative and a methyl ester of a dihydronaphthalenedicarboxylic acid.

6. A composition of matter comprising a cellulose derivative and dimethyl 1,4-dihydronaphthalene-1,4-dicarboxylate.

7. A composition of matter comprising cellulose acetate and dimethyl 1,4-dihydronaphthalene-1,4-dicarboxylate.

8. A thin transparent film comprising a cellulose derivative and an ester of a dihydronaphthalenedicarboxylic acid.

9. A thin transparent film comprising a cellulose derivative and a monohydric alcohol ester of a dihydronaphthalenedicarboxylic acid.

10. A thin transparent film comprising a cellulose derivative and a methyl ester of a dihydronaphthalenedicarboxylic acid.

11. A thin transparent film comprising a cellulose derivative, and dimethyl 1,4-dihydronaphthalene-1,4-dicarboxylate.

12. A composition of matter comprising a cellulose derivative and an ester of a dihydronaphthalenedicarboxylic acid having a hydrogen atom and a carboxyl group on each of two carbon atoms.

13. A composition of matter comprising a cellulose derivative and a methyl ester of a dihydronaphthalenedicarboxylic acid having a hydrogen atom and a carboxyl group on each of two carbon atoms.

14. A thin transparent film comprising a cellulose derivative and an ester of a dihydronaphthalenedicarboxylic acid having a hydrogen atom and a carboxyl group on each of two carbon atoms.

15. A thin transparent film comprising a cellulose derivative and a methyl ester of a dihydronaphthalenedicarboxylic acid having a hydrogen atom and a carboxyl group on each of two carbon atoms.

16. A composition of matter comprising a cellulose derivative and a dodecyl ester of a dihydronaphthalenedicarboxylic acid.

17. A composition of matter comprising cellulose nitrate and a dodecyl ester of a dihydronaphthalenedicarboxylic acid.

18. A composition of matter comprising cellulose nitrate and didodecyl 1,4-dihydronaphthalene-1,4-dicarboxylate.

NORMAN D. SCOTT.